No. 639,588. Patented Dec. 19, 1899.
S. H. LAW.
BICYCLE ATTACHMENT.
(Application filed Mar. 11, 1898.)
(No Model.) 2 Sheets—Sheet 1.
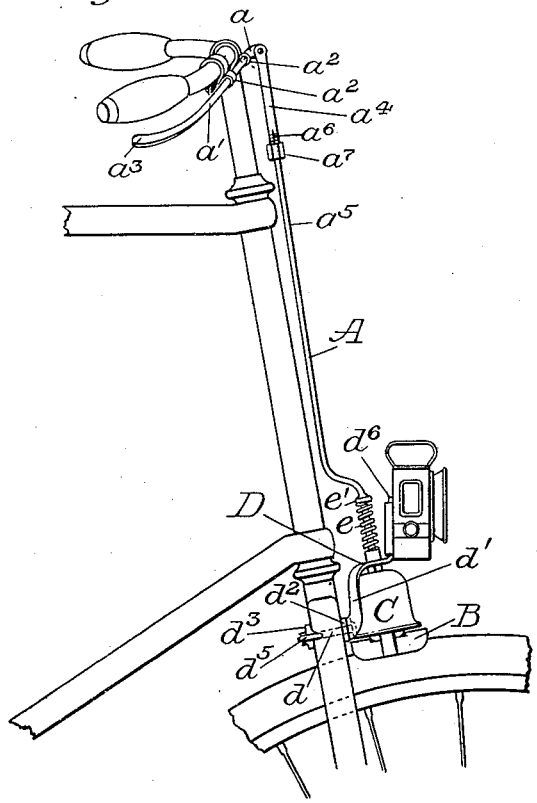
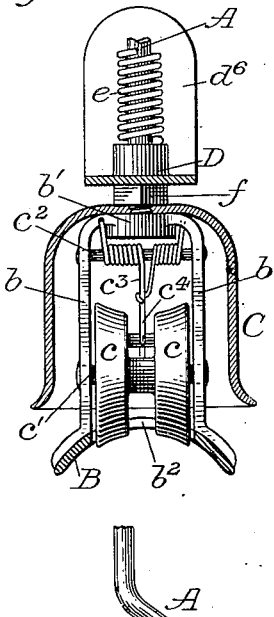
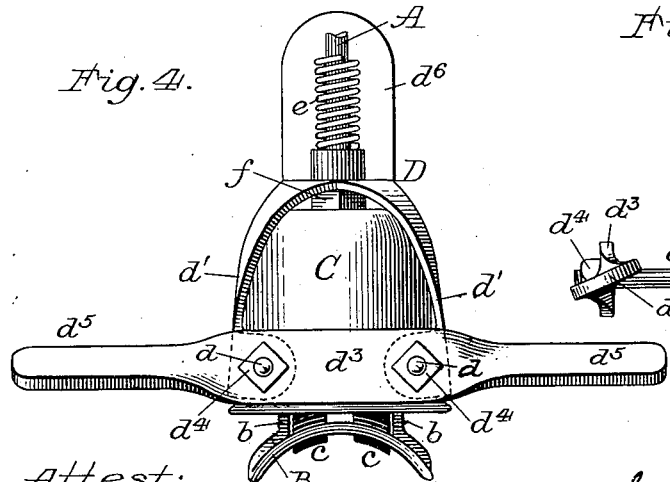
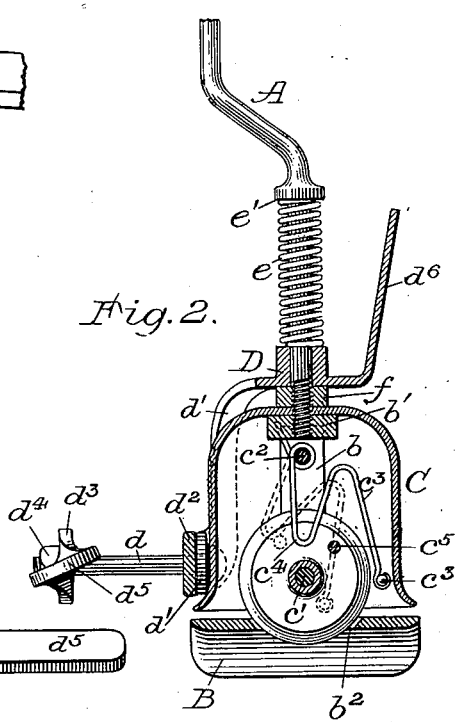
Attest:
Robt. L. Dutton
W. H. Somerwell
Inventor:
Samuel H. Law.
By Philip F. Larner,
Attorney.

No. 639,588. Patented Dec. 19, 1899.
S. H. LAW.
BICYCLE ATTACHMENT.
(Application filed Mar. 11, 1898.)
(No Model.) 2 Sheets—Sheet 2.
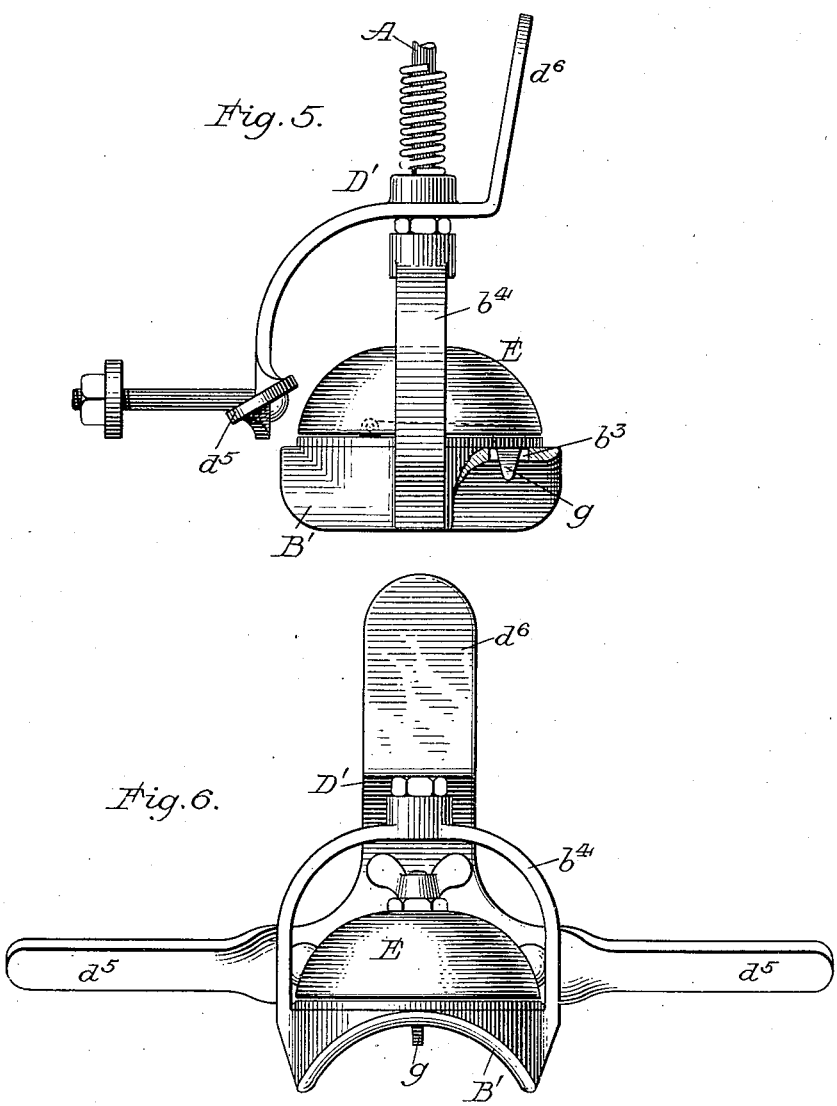

UNITED STATES PATENT OFFICE.

SAMUEL H. LAW, OF NEW YORK, N. Y.

BICYCLE ATTACHMENT.

SPECIFICATION forming part of Letters Patent No. 639,588, dated December 19, 1899.

Application filed March 11, 1898. Serial No. 673,434. (No model.)

*To all whom it may concern:*

Be it known that I, SAMUEL H. LAW, a citizen of the United States, residing at New York, (Brooklyn,) in the county of Kings and State of New York, have invented certain new and useful Improvements in Bicycle Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

My said improvements relate to an attachment for bicycles which embodies a wheel-brake and a signaling device adapted to be operated by contact with the wheel of a bicycle, both the brake and signaling device being carried by and operated from a single depressible rod, which is under the control of a hand-lever secured to the handle-bar of the machine.

The main object sought by me is to so combine the brake and signaling device that they will occupy the smallest possible space and obviate the objectionable feature of prior organizations of this character of having the signaling device so located with reference to the brake-shoe as to be specially liable to injury from knocks and jars, to which a bicycle is liable, even with ordinary care in usage.

After a detail description of my invention in connection with the drawings furnished the features deemed novel will be duly specified in the several clauses of claim hereunto annexed.

Referring to the drawings, Figure 1 illustrates a portion of a bicycle with my complete attachment applied thereto. Fig. 2 is a central vertical cross-section through the signaling device and brake-shoe. Fig. 3 is a central vertical section through the signaling device and brake-shoe on a line at right angles to that of Fig. 2. Fig. 4 illustrates the brake-shoe, signaling device, and clamping mechanism in rear elevation. Figs. 5 and 6 illustrate in side and front views, respectively, a modified form of supporting-bracket and a signaling device of a different form combined with a brake-shoe in accordance with one portion of my invention.

Referring to the attachment illustrated in Figs. 1, 2, 3, and 4, the rod A, carrying the brake-shoe B and bell C, is at its lower end slidably mounted in a bracket D, which is firmly secured to the fork of a bicycle by means of bolts $d\ d$, which pass through rearward extensions $d'\ d'$ of said bracket and through a front clamping-bar $d^2$ and rear clamping-bar $d^3$, the fork of the bicycle being grasped between said clamping-bars and firmly clamped by the nuts $d^4\ d^4$, as clearly shown. As here shown, the rear clamping-bar $d^3$ is made somewhat longer than the front clamping-bar, so as to extend a sufficient distance at each side of the fork to serve as "coasters" or foot-rests $d^5\ d^5$, and I prefer that these be bent or twisted, as shown, to afford a flat bearing-surface at the proper angle for the feet of a rider. At the front of the bracket D is provided an upwardly-extending lug or projection $d^6$ for supporting a bicycle-lamp, as illustrated in Fig. 1.

The rod A is bent inward above the bracket D, as shown, so as to lie close to the frame of a bicycle, and at its upper end the rod A is pivoted to a small lever $a$, secured to the end of a rock-shaft $a'$, mounted in bearings $a^2\ a^2$, which are clamped to the bicycle handle-bar. The outer end of said rock-shaft is bent to afford a hand-lever $a^3$, by means of which the rock-shaft is rotated for causing a depression of the rod A for operating the signaling device or brake, as may be desired. A spiral spring $e$, interposed between the bracket D and a shoulder $e'$, formed upon the bar A, tends to keep the latter in its normal or elevated position.

For affording means of adjusting the brake-shoe and signaling device with reference to the wheel and handle-bar of a bicycle the rod A is constructed in two sections $a^4\ a^5$, adjustable with reference to each other. The upper section $a^4$ is made hollow to receive the upper end of the lower section $a^5$, and it is split, as at $a^6$, and provided with a tapered screw-threaded end and a nut $a^7$ for locking the sections at the desired point of adjustment, as will be readily understood.

The brake-shoe B is secured to the two arms of a yoke $b$, which at its upper end is provided with an internally-screw-threaded hub $b'$, by means of which it is secured to the end of the rod A, as shown. The bell C is secured to the rod A between a nut $f$ and the hub $b'$ of the yoke $b$ and completely surrounds the latter and the bell-operating mechanism supported thereby. Between the two arms of the yoke $b$ is mounted friction-rollers $c\ c$, coupled together upon a shaft $c'$. The bearing-surfaces of the rollers $c\ c$ are made to conform to the cross-sectional contour of a bicycle-tire, and they project through an opening $b^2$ in the brake-shoe B, so that they may be brought in contact with the wheel-tire and rotated thereby by a depression of the rod A insufficient to cause the brake to act. Above the rollers $c\ c$ is a shaft $c^2$, upon which is mounted a spring bell-hammer $c^3$, composed of spring-wire and provided with a bend or projection $c^4$, which extends between the rollers $c\ c$ and is adapted to be engaged by a pin or projection $c^5$ upon said rollers for causing the hammer to vibrate for sounding the bell, as will be readily understood. As thus organized the signaling device and its operating mechanism are mounted wholly within the axial line of the brake-rod A, and consequently offer no objectionable projections and are less liable to injury from knocks and jars than when mounted to the one side of said rod, as in prior organizations of similar character. This forms a valuable feature of my invention regardless of the particular form of signaling device employed.

In Figs. 5 and 6 I show a signaling device E, consisting of a well-known form of bell operated by spring-actuated mechanism. (Not shown.) This bell is provided with a releasing-lever $g$, which projects through an opening $b^3$ in the brake-shoe B' and is adapted to be raised by contact with the bicycle-wheel for releasing the spring-operating mechanism of the bell in a manner well known. This signaling device is mounted upon the brake-shoe B' between the arms of a yoke $b^4$, which is secured to the brake-rod A, as before described. With this device, as with the one before described, light pressure applied to the hand-lever will bring the operating mechanism of the signaling device into contact with the bicycle-wheel and cause an alarm to be sounded without causing the brake to be operated, the latter operating only when greater pressure is applied to the hand-lever than is requisite for sounding a signal.

The supporting-bracket D' (illustrated in Figs. 5 and 6) is provided with the lamp-supporting lug $d^6$ before described; but the rear arm of this bracket supplies the place of the front clamping-bar of Figs. 1, 2, 3, and 4 and has coasters or foot-rests $d^5$, formed integrally therewith.

Having thus described my invention, what I claim as new, and desire to secure by Letters Patent, is—

1. The combination with a bicycle brake-rod having a brake-shoe rigidly secured thereto, of a signaling device adapted to be operated by contact with the wheel of a bicycle, the said device being mounted within the axial line of the brake-rod and controlled thereby, substantially as described.

2. The combination with a bicycle brake-rod having a brake-shoe rigidly secured thereto, of a signaling device mounted thereon within the axial line of the brake-rod and adapted to be operated by contact with the wheel of the bicycle, through mechanism which projects below the face-line of said shoe through an opening formed therein, substantially as described.

3. In a bicycle attachment the combination of a brake-rod having a brake-shoe rigidly secured thereto and a signaling device mounted thereon within the axial line of the brake-rod and adapted to be operated by contact with the wheel of a bicycle, a bracket adapted to be secured to the fork of a bicycle for supporting said rod, a spring interposed between said bracket and a shoulder formed on said rod, and means for moving said rod toward the wheel of a bicycle, substantially as described.

4. The combination with the brake-rod of a bicycle having a brake-shoe rigidly secured thereto, of a signaling device mounted thereon within the axial line of the brake-rod and adapted to be operated by the rotation of a friction-roller which engages with the periphery of the bicycle-wheel through an opening in the brake-shoe when the latter is depressed, substantially as described.

5. In a bicycle attachment the combination of a brake-shoe, of a yoke mounted thereon, a friction-roller mounted in said yoke, the said roller projecting below the face-line of the shoe through an opening formed therein, a bell-hammer also mounted in said yoke, a pin or projection carried by said roller adapted to engage with the bell-hammer for vibrating the same, and a bell which surrounds said yoke and the mechanism supported thereby, the whole being adapted to be secured to the brake-rod of a bicycle, substantially as described.

In testimony whereof I have affixed my signature in presence of two witnesses.

SAMUEL H. LAW.

Witnesses:
JOHN B. FORD,
HARRISON O. LAW.